Patented Mar. 15, 1938

2,111,101

UNITED STATES PATENT OFFICE 2,111,101

ELECTRIC PROTECTIVE ARRANGEMENT

Henry Leyburn, Newcastle-on-Tyne, England, assignor to A. Reyrolle & Company Limited, Hebburn-on-Tyne, England, a company of Great Britain Application March 2, 1936, Serial No. 66,741
In Great Britain March 14, 1935

18 Claims. (Cl. 175—294)

This invention relates to an electric protective arrangement for affording discriminative protection for the individual sections of an A. C. network or portion of a network to which a number of external feeder or other circuits are connected. Thus the invention is applicable to the discriminative protection of a sectionalized busbar system, in which some external feeder or other circuits are connected to one busbar section and others to one or more other busbar sections, and the arrangement will act to cut out one busbar section in the event of a fault thereon leaving the other busbar section or sections in circuit.

Existing protective arrangements for such a network have usually been of the Merz-Price type, with separate protective gear for each section, current transformers in all the circuits connected to the individual section being connected together in such a manner that the total current entering the individual section is balanced against that leaving the section, the section being cut out when such balance is disturbed. In a network of this kind, however, it is usually desirable to be able to transfer the connections of an external feeder or other circuit from one section of the network to another in order to be able to maintain the supply over such circuit after any one section has been cut out. With the existing protective arrangements however such transfer necessitates the provision of auxiliary switches in the current transformer connections to enable the current transformers to be transferred from one protective gear to another in accordance with the transfer of the associated feeder or other circuits. The use of such auxiliary switches in the current transformer connections is however unsatisfactory for a variety of reasons, amongst which may be mentioned the fact that the failure of one auxiliary switch may well cause the inadvertent shutting down of the whole network.

The present invention has for its main object to provide a protective arrangement for a network or portion of a network of this kind which will properly discriminate between faulty and healthy sections of the network and in which adequate safeguards are provided to prevent inadvertent tripping out of a healthy section in the event of a fault external to the network or network portion. A further object is so to arrange the protective circuits as to enable the use of auxiliary switches in the current transformer connections, which might give rise to incorrect operation, to be avoided.

In the protective arrangement according to a preferred embodiment of the invention, the cutting out of each section of the network or portion of a network is controlled by directional relay devices on all the circuits (whether external to the network or within the network) connected to the individual section in accordance with the direction of fault current flow in such circuits, the operation of each directional relay being effected by cooperation between the fault current flow in the associated circuit and the total fault current flow in all the external feeder or other circuits connected to the whole network or network portion. Conveniently current transformers on all the external feeder or other circuits are permanently connected in circuit with one another for the energization of the directional relays in accordance with the total fault current flow in such circuits.

Thus the arrangement may comprise for each section, a tripping relay acting to disconnect the section from all circuits connected thereto, a lock-out relay acting when energized to render the tripping relay inoperative, and means whereby the directional relay device associated with each external feeder or other circuit connected to the section acts to energize or prepare an energizing circuit either for the tripping relay when the fault current in the feeder or other circuit is flowing towards the section, or for the lock-out relay when the fault current is flowing away from the section. The energizing circuits of the tripping and lock-out relays for the sections are preferably controlled by a master relay energized in accordance with the total fault current flow in all the external feeder or other circuits.

It will be appreciated that with the arrangement according to the invention transfer of an external feeder or other circuit from one section to another can be catered for by auxiliary switches in the connections between the directional relay devices and the tripping and lock-out relays, i. e. in positions where their failure cannot have such serious consequences as may arise from the failure of an auxiliary switch in the current transformer connections.

The invention may be carried into practice in various ways, but a preferred practical arrangement according to the invention (as applied to the protection of a three-phase duplicate busbar system) and some modifications thereof are illustrated diagrammatically by way of example in the accompanying drawings, in which Figure 1 shows in single line diagram the preferred arrangement as applied to earth leakage protection;

Figure 5 shows part of Figure 1 as modified for application to interphase fault protection.

Figure 1:
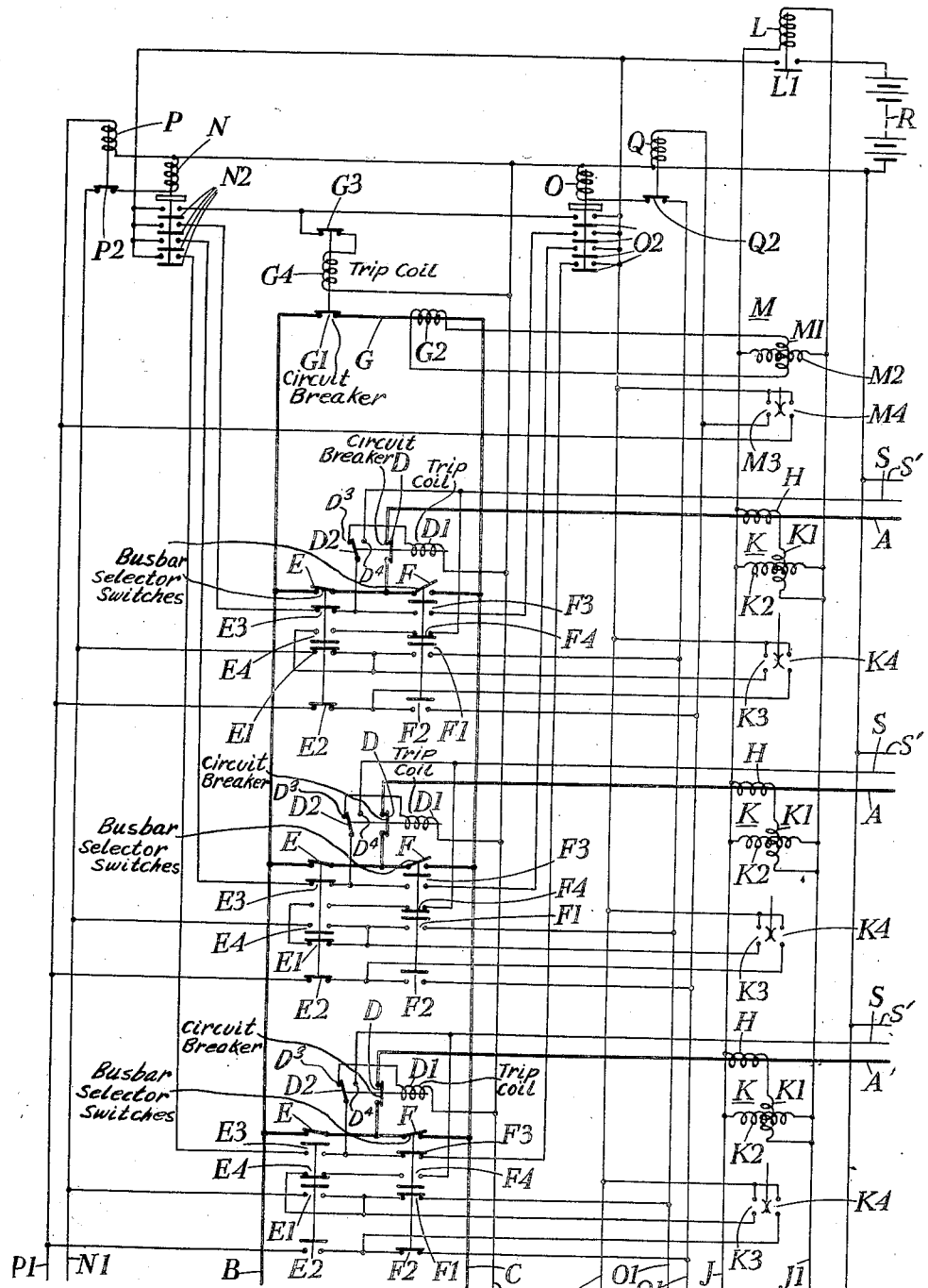

In the duplicate busbar system to which the invention is applied in the drawings, a number of external feeder or other circuits A (for convenience referred to hereinafter as feeders) can be connected to either busbar B or C through circuit-breakers D provided with the usual busbar selector switches E F and the two busbars B C can be connected together or disconnected from one another by a busbar coupling G controlled by a circuit-breaker $G^1$.

Figure 3:
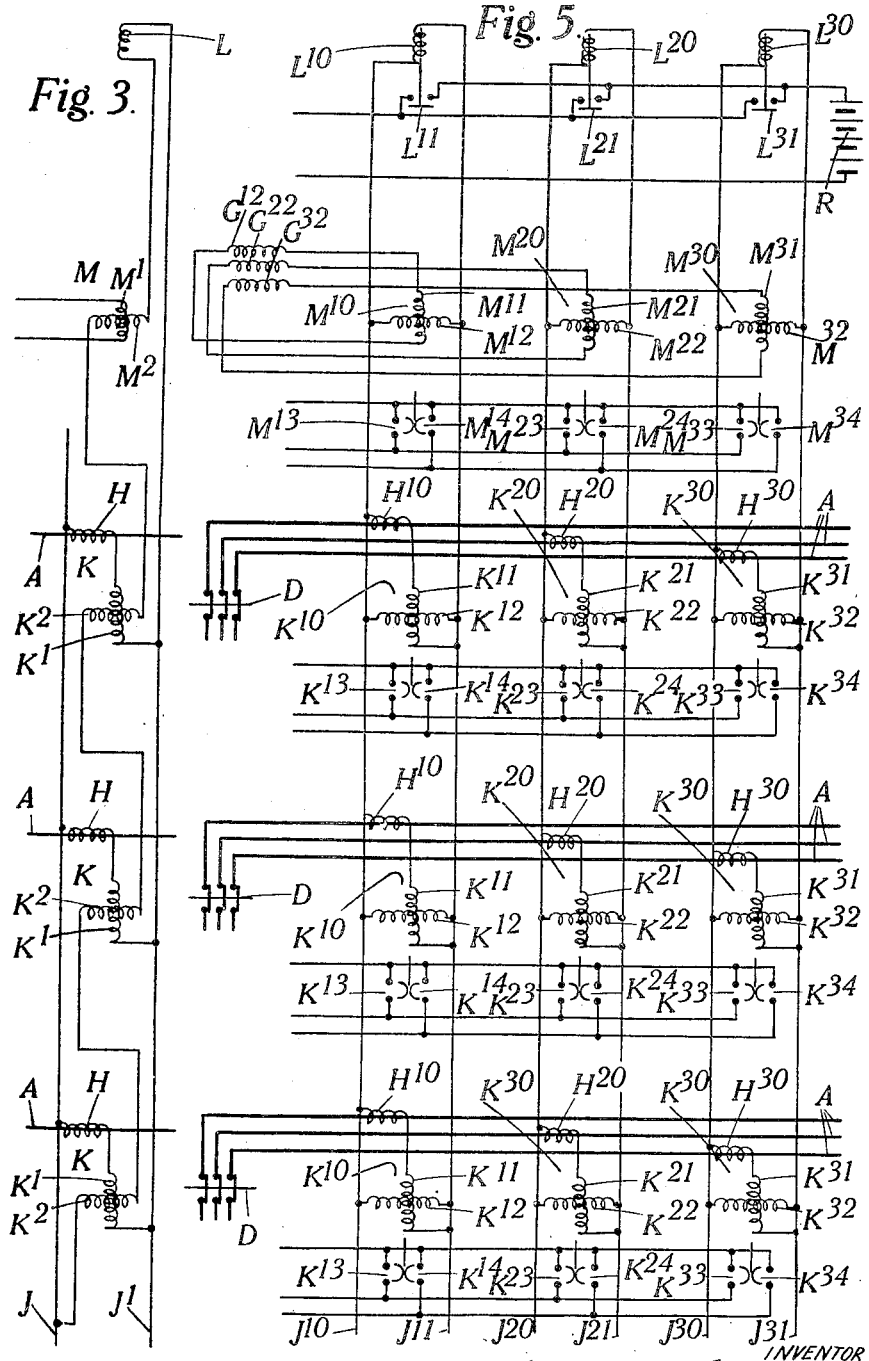
Figure 3 illustrates a modification of the right-hand side of Figure 1 showing a different method of energization of the directional relay coils.

In this arrangement each feeder A is provided at H with a core-balance current transformer or group of current transformers having their secondaries connected in parallel to give a secondary voltage corresponding to the earth-leakage current in the feeder. The current transformer secondary circuit is connected on one side to a buswire J common to all the feeders A and on the other side through one of the coils $K^1$ of a directional relay K to another common buswire $J^1$. The second coil $K^2$ of the directional relay K, instead of being connected to a source of potential, is connected across the two buswires J $J^1$, so that it is energized in accordance with the total earth-leakage current on the whole group of feeders. Alternatively the second coils $K^2$ of all the directional relays may be connected in series with one another across the two buswires J $J^1$ as shown in Figure 3, wherein for simplicity the same reference letters are employed as in Figure 1. A master relay L is also connected across the two buswires J $J^1$ (as shown in Figure 1) or in series with the second coils $K^2$ of the directional relays (as shown in Figure 3).

Each directional relay K operates one or the other of two contacts $K^3$ $K^4$, a tripping contact and a lock-out contact, in accordance with the direction of flow of the earth-leakage current in the associated feeder A, the tripping contact $K^3$ being operated when the flow is towards the busbars B C and the lock-out contact $K^4$ when the flow is away from the busbars.

The busbar coupling G also has at $G^2$ an earth-leakage current transformer or group of current transformers connected to the first coil $M^1$ of a directional relay M whose second coil $M^2$ is energized in parallel (Figure 1) or in series (Figure 3) with the second coils $K^2$ of the feeder directional relays K. This relay M operates its two contacts $M^3$ $M^4$ in accordance with the direction of earth-leakage current flow through the busbar coupler G.

Each busbar B or C is provided with a D. C. tripping relay N or O and a D. C. lock-out relay P or Q, the four relays N O P Q being connected respectively to four further buswires $N^1$ $O^1$ $P^1$ $Q^1$. Each lock-out relay P or Q has a normally closed contact $P^2$ or $Q^2$ in the energizing circuit of the associated tripping relay N or O, and each tripping relay N or O has a number of normally-open contacts $N^2$ or $O^2$, one for each feeder A and one for the busbar coupler G. The supply of D. C. energizing current for these four relays N O P Q is derived from a suitable auxiliary source, such as a battery R, and is controlled by the normally-open contact $L^1$ of the master relay L and the contacts $M^3$ $M^4$ and $K^3$ $K^4$ of the directional relays. These circuits are also controlled by auxiliary switches $E^1$ $E^2$ $F^1$ $F^2$ on the busbar selector switches EF associated with the feeder circuit-breakers D, these auxiliary switches being closed or open respectively when the corresponding busbar selector switches are closed or open. Simplified diagrams of these circuits are shown in Figures 2a, 2b, and 2c.

Thus the energizing circuit for the lock-out relay P associated with the busbar B is taken from the positive pole of the battery R, through the master relay contact $L^1$ and the positive buswire $R^1$ and thence either through the busbar coupler directional relay contact $M^4$ direct to the buswire $P^1$ (Figure 2a) or through any of the feeder directional relay lock-out contacts $K^4$ and the corresponding busbar selector auxiliary switch $E^2$ to the buswire $P^1$ (Figure 2b), the buswire $P^1$ being directly connected through the lock-out relay P to the negative pole of the battery R.

Figure 2:
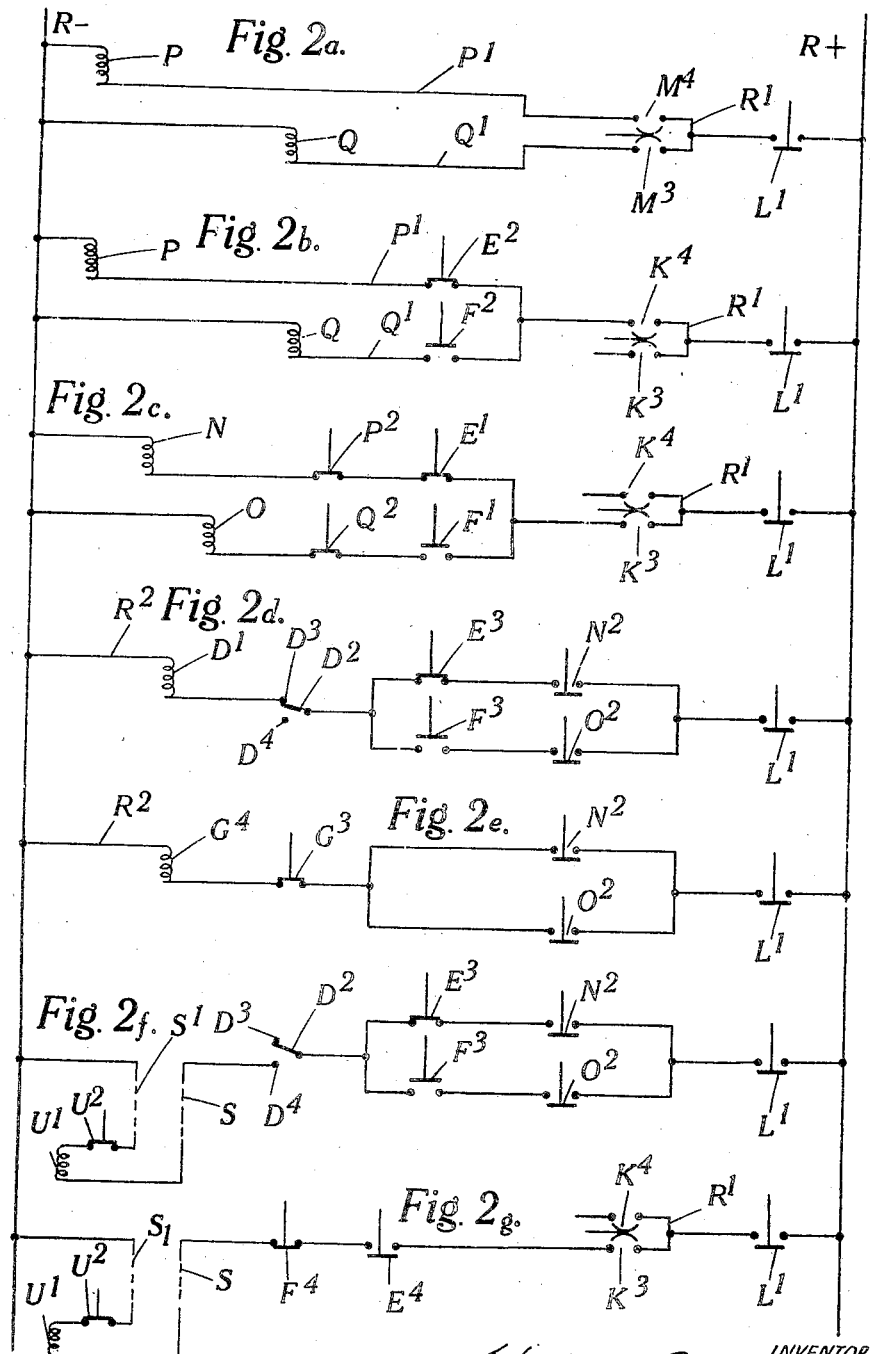
Figures 2a to 2g are schematic diagrams of individual circuits in the arrangement of Figure 1.

The lock-out relay Q for the busbar C has a similar energizing circuit, the connection from the positive buswire $R^1$ to the buswire $Q^1$, which is connected through the relay Q to the negative pole of the battery R, in this case being taken either directly through the other busbar coupler directional relay contact $M^3$ (Figure 2a) or through any of the feeder directional relay lock-out contacts $K^4$ and the corresponding busbar selector auxiliary switch $F^2$ (Figure 2b).

The busbar selector auxiliary switches $E^2$ $F^2$ thus serve to ensure that the directional relay lock-out contact $K^4$ is connected only to the lock-out buswire $P^1$ or $Q^1$ associated with the busbar B or C to which the particular feeder A is connected.

The energizing circuits for the two tripping relays N and O (Figure 2c) are taken from the positive pole of the battery R through the master relay contact $L^1$ and the positive buswire $R^1$ and thence through any of the feeder directional relay tripping contacts $K^3$ either through the corresponding busbar selector auxiliary switch $E^1$, the buswire $N^1$, the lock-out relay contact $P^2$ and the tripping relay N, or through the corresponding busbar selector auxiliary switch $F^1$, the buswire $O^1$, the lock-out relay contact $Q^2$ and the tripping relay O, to the negative pole of the battery R. The auxiliary switches $E^1$ $F^1$ ensure that the contact $K^3$ is connected to the busbar $N^1$ or $O^1$ associated with the busbar to which the particular feeder A is connected.

As will be explained in detail later, the operation of the tripping relay N causes the associated busbar B to be cut out, while the tripping relay O likewise causes the busbar C to be cut out. The operating mechanisms of the four relays N, O, P, Q are so arranged that the lock-out relays operate more quickly than the tripping relays, so that in the event of simultaneous energization of a lock-out relay (say P) and its associated tripping relay (N), the tripping relay will be prevented from operating its contacts by the opening of the lock-out relay contact ($P^2$). Thus a busbar will not be cut out if its lock-out relay is energized, that is if earth-fault current is flowing away from the busbar in any one of the circuits connected thereto (including the busbar coupling connection) even when earth-fault current happens to be flowing towards the busbar in all the other such circuits.

Moreover all four relays N, O, P, Q remain inoperative unless the master relay L closes its contact $L^1$. Since the master relay is energized from the buswires J $J^1$, it cannot operate until the earth-fault current flowing into the whole busbar network exceeds that flowing out therefrom by a predetermined amount, so that the relay will only operate in the event of an earth-fault on one of the busbars B or C or on the portion of a feeder A between the current transformer H and the busbar, for in the event of an external earth-fault, the earth-fault current entering the busbar network will balance that leaving the network and the total earth-fault current will therefore be zero. The master relay and the directional relays thus constitute independent safeguards against inadvertent cutting out of a busbar, which might otherwise result for example from a fault in the protective gear itself.

The manner in which the tripping relays N, O control the cutting out of the associated busbars will now be described, simplified diagrams of the trip circuits being shown in Figures 2d and 2e. These circuits include further auxiliary switches $E^3$ $F^3$ on the busbar selector switches (closed or open in accordance respectively with whether the corresponding busbar selector switches are closed or open), these switches thus serving to ensure that the feeder circuit-breaker trip coil $D^1$ is connected to the contacts of the tripping relay N or O associated with the busbar B or C to which the particular feeder A is connected. The trip circuits also include auxiliary change-over switches $D^2$ on the feeder circuit-breakers themselves, the switch $D^2$ being in engagement with its contact $D^3$ connected to the trip coil $D^1$ when the main circuit-breaker D is closed and in engagement with its other contact $D^4$ when the circuit-breaker D is open. Thus (see Figure 2d) the trip circuit for each feeder circuit-breaker is taken from the positive pole of the battery R through the master relay contact $L^1$ and thence either through one of the contacts $N^2$ of the tripping relay N and the corresponding busbar selector auxiliary switch $E^3$ or through one of the contacts $O^2$ of the tripping relay O and the corresponding busbar selector auxiliary switch $F^3$, to the auxiliary change-over switch $D^2$ on its contact $D^3$, and then through the circuit-breaker trip coil $D^1$ and the negative buswire $R^2$ to the negative pole of the battery R.

The busbar coupling circuit-breaker $G^1$ is also provided with an auxiliary switch $G^3$ (closed or open respectively when the circuit-breaker is closed or open) controlling the connection of the appropriate tripping relay contacts $N^2$ $O^2$ to the trip coil $G^4$ of this circuit-breaker. The trip circuit for this circuit-breaker (see Figure 2e) is taken from the positive pole of the battery R, through the master relay contact $L^1$ and through either tripping relay contact $N^2$ or $O^2$, and then through the auxiliary switch $G^3$, the trip coil $G^4$ and the negative buswire $R^2$ to the negative pole of the battery R.

Thus normally all the relays are deenergized. In the event of an external earth fault the master relay L remains inoperative and consequently prevents the directional relays K M from energizing the tripping and lock-out relays N O P Q.

If a fault occurs on one busbar, say B, when the busbar coupling circuit-breaker $G^1$ is open, the master relay L will operate and the directional relays K on the feeders connected to the faulty busbar will operate their tripping contacts $K^3$, since the earth-leakage current in all these feeders will be flowing towards the fault. Consequently the lock-out relay P associated with the faulty busbar B will remain inoperative and the tripping relay N will operate and isolate the faulty busbar B.

If a fault occurs on one busbar, say B, when the busbar coupling circuit-breaker $G^1$ is closed, the directional relays K on the feeders connected to the healthy busbar C will also close their tripping contacts $K^3$, but the busbar coupler directional relay M will operate one contact $M^3$ to energize the lock-out relay Q associated with the healthy busbar C, so that only the faulty busbar B will be cut out.

If certain of the feeders A happen to be interconnected at their remote ends, it may happen that earth-leakage current may flow through feeders connected to the healthy busbar, say C, when the busbar coupling circuit-breaker $G^1$ is open. In such a case however the flow in at least one of such feeders will be outwards, and the directional relay K on such feeder will operate its lock-out contact $K^4$ to energize the associated lock-out relay Q and prevent tripping out of the healthy busbar C.

Figure 4:
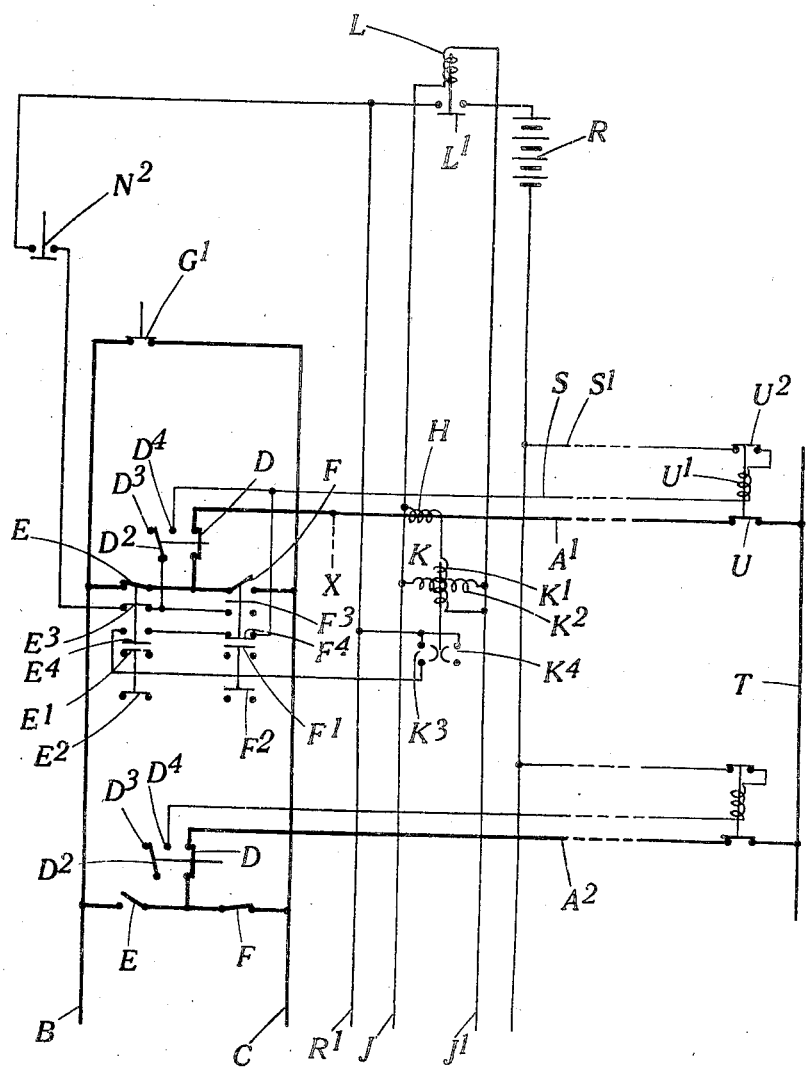
Figure 4 illustrates the use of part of the arrangement of Figure 1 for effecting tripping of a faulty feeder (or other external circuit) at the remote end.

In the event of a fault on one feeder A in the small portion between its current transformers H and the circuit-breaker D, the relays will operate to cut out the busbar to which such feeder is connected, but it will be appreciated that the fault may then still be fed through the faulty feeder from the remote end. It is desirable therefore to provide means for tripping the circuit-breaker at the remote end of the faulty feeder, and it is for this purpose that the second contact $D^4$ is provided on the auxiliary change-over switch $D^2$. Figure 4 shows two feeders $A^1$ $A^2$ which are interconnected at the remote end (as indicated by the connection T), the feeder $A^1$ being assumed to be connected to the busbar B through its circuit-breaker D and its busbar selector switch E, while the feeder $A^2$ is connected to the busbar C through its circuit-breaker D and its busbar selector switch F. If now a fault occurs at the point X on the feeder $A^1$ between its current transformer H and its circuit-breaker D, the protective gear will act in the manner above described to isolate the busbar B. Although the circuit-breaker D on the faulty feeder $A^1$ will now be opened the fault at X can still be fed through the busbar C, the feeder $A^2$ and the interconnection T, but the protective gear will not act to cut out the busbar C, since the fault current in the feeder $A^2$ will be flowing out away from such busbar. The contact $D^4$ is connected to a pilot wire S which leads, together with a second busbar $S^1$ connected to the negative pole of the battery R, to a trip coil $U^1$ for a circuit-breaker U at the remote end of the feeder, an auxiliary switch $U^2$ (closed or open respectively when the circuit-breaker U is closed or open) preferably being provided in the pilot circuit. The opening of the circuit-breaker D on the faulty feeder $A^1$ will cause the change-over switch $D^2$ to engage with its contact $D^4$ and will thus complete the energizing circuit to the trip coil $U^1$ at the remote end of the faulty feeder $A^1$ (see Figure 2f). The faulty feeder $A^1$ will thus be isolated at both ends.

Figures 1 and 4 also show further auxiliary switches $E^4$ $F^4$ on the busbar selector switches E, F, these auxiliary switches being open when their associated busbar selector switches are closed, and vice versa. These auxiliary switches are provided for the purpose of cutting out a feeder, say $A^1$, at the remote end in the event of a fault on it at X between its current transformer H and its circuit-breaker D at a time when the feeder is disconnected from both busbars B and C, the fault being fed from the remote end of the feeder. In such a case the directional relay K on the faulty feeder $A^1$ will close its tripping contact $K^3$ and the master relay L will close its contact $L^1$. Neither of the tripping relays N or O will operate, however, since the busbar selector switches E, F (and consequently also the auxiliary switches $E^2 F^2$) will both be open as the feeder is assumed to be disconnected from both busbars. The two auxiliary switches $E^4 F^4$ will however both be closed, and since these switches are in series in a direct connection from the directional relay contact $K^3$ to the pilot wire S, an energizing circuit for the remote trip coil $U^1$ on the faulty feeder will be completed. This circuit is taken (see Figure 2g) from the positive pole of the battery R through the master relay contact $L^1$, the positive buswire $R^1$, the directional relay tripping contact $K^3$ on the faulty feeder, the busbar selector auxiliary switches $E^4 F^4$, the pilot wire S, the remote trip coil $U^1$ on the faulty feeder, its associated auxiliary switch $U^2$ and the pilot wire $S^1$ back to the negative pole of the battery R. The faulty feeder will thus be cut out at the remote end.

In the above description the feeder directional relays K have been described as of the two-contact centre-zero type. In practice however it is sometimes more convenient to employ an ordinary excess current relay in conjunction with a directional relay of the ordinary single-contact type, the over-current relay operating what has been termed above the tripping contact $K^3$, whilst the contact of the directional relay constitutes the lock-out contact $K^4$.

Where it is desirable for the feeder current transformers to have different ratios, the desired balanced total earth-leakage current can be obtained in the well-known manner by means of auxiliary summation transformers.

The foregoing arrangement has been described solely with reference to earth-fault protection, but it can readily be adapted to deal with interphase faults, as will be clear from Figure 5, which shows the right-hand portion of Figure 1 modified to suit interphase-fault protection, the remainder of the circuits being identical with those of Figure 1. The arrangement of Figure 5 differs from that of Figure 1 generally in the triplication of the master relay and directional relays and the associated circuits. Thus the earth-leakage current transformer (or transformers) H on each feeder A is replaced by three current transformers $H^{10} H^{20} H^{30}$ respectively on the three phases of the feeder A, and all the current transformers $H^{10}$ (or $H^{20}$ or $H^{30}$) in each phase are connected in parallel to one another to buswires $J^{10} J^{11}$ (or $J^{20} J^{21}$ or $J^{30} J^{31}$), each transformer having in series with it one coil $K^{11}$ (or $K^{21}$ or $K^{31}$) of the associated directional relay $K^{10}$ (or $K^{20}$ or $K^{30}$). The second coils $K^{12}$ (or $K^{22}$ or $K^{32}$) of such relays are connected in parallel (or alternatively in series as in Figure 3) across the buswires $J^{10} J^{11}$ (or $J^{20} J^{21}$ or $J^{30} J^{31}$). The tripping contacts $K^{13} K^{23} K^{33}$ of the three directional relays on each feeder A are connected in parallel with one another, as also are the three lock-out contacts $K^{14} K^{24} K^{34}$. Three busbar coupling directional relays $M^{10} M^{20} M^{30}$ are provided, one in each phase, with their first coils $M^{11} M^{21} M^{31}$ respectively energized from single-phase transformers $G^{12} G^{22} G^{32}$ on the individual phases of the busbar coupling connection, and with their second coils $M^{12} M^{22} M^{32}$ in parallel (or in series) respectively with the feeder directional relay second coils $K^{12} K^{22} K^{32}$. The contacts $M^{13} M^{23} M^{33}$ of these relays are connected in parallel with one another as also are the contacts $M^{14} M^{24} M^{34}$. Three master relays $L^{10} L^{20} L^{30}$ are provided, one in each phase, and are connected respectively in parallel (or in series) with the second coils $K^{12} K^{22} K^{32}$ of the directional relays across the buswires $J^{10} J^{11}$, $J^{20} J^{21}$, $J^{30} J^{31}$. The contacts $L^{11} L^{21} L^{31}$ of the three master relays are connected in parallel with one another. In other respects the arrangement is identical with that of Figure 1 and the operation of the arrangement will be apparent without further description.

It will be appreciated that the above arrangement has been described by way of example only and may be modified in various ways within the scope of the invention. Thus for instance the arrangement can readily be adapted to suit network arrangements other than the duplicate busbar system described.

What I claim as my invention and desire to secure by Letters Patent is:—

1. An electric protective arrangement for affording discriminative protection for the individual sections of an A. C. network or portion of a network to which a number of external circuits are connected, comprising in combination directional relay devices on all the circuits connected to each individual section, means whereby such directional relay devices control the cutting out of the section in accordance with the direction of fault current flow in the associated circuits, and means whereby the operation of each directional relay device is effected by cooperation between the fault current flow in the associated circuit and the total fault current flow in all the external circuits connected to the whole network or network portion.

2. An electric protective arrangement for affording discriminative protection for the individual sections of an A. C. network or portion of a network to which a number of external circuits are connected, comprising in combination directional relay devices on all the circuits connected to each individual section, means whereby such directional relay devices control the cutting out of the section in accordance with the direction of fault current flow in the associated circuits, current transformers on all the external circuits connected to the network or network portion, means for permanently connecting all such transformers in circuit with one another to provide a source of energy representative of the total fault current flow in all the external circuits, and means whereby each directional relay device is energized partly in accordance with the fault current flow in the associated circuit and partly from such source.

3. An electric protective arrangement for affording discriminative protection for the individual sections of an A. C. network or portion of a network to which a number of external circuits are connected, comprising in combination current transformers on all the external circuits connected to the network or network portion, means for permanently connecting all such transformers in circuit with one another to provide a source of energy representative of the total fault current flow in all the external circuits, current transformers on the circuits within the network or network portion connecting individual sections with one another, a directional relay device associated with each current transformer, means whereby such device is energized partly from the associated current transformer and partly from the source of energy representative of total fault current flow, and means whereby the directional relay devices associated with the circuits connected to an individual section control the cutting out of the section in accordance with the direction of fault current flow in the associated circuits.

4. In a duplicate busbar electric system, the combination with the two busbars, of a busbar coupling connection by means of which the two busbars can be coupled together or disconnected from one another, a number of external circuits, means for selectively connecting such circuits to the busbars, and an electric protective arrangement for affording discriminative protection for the two busbars comprising a directional relay device associated with the busbar coupling connection, a directional relay device associated with each external circuit, means whereby the operation of each directional relay device is effected by cooperation between the fault current flow in the associated circuit and the total fault current flow in all the external circuits, and means whereby the directional relay devices associated with the circuits connected to an individual busbar control the cutting out of such busbar in accordance with the direction of fault current flow in the associated circuits.

5. In a duplicate busbar electric system, the combination with the two busbars, of a busbar coupling connection by means of which the two busbars can be coupled together or disconnected from one another, a number of external circuits, means for selectively connecting such circuits to the busbars, and an electric protective arrangement for affording discriminative protection for the two busbars comprising current transformers on all the external circuits, means for permanently connecting all such current transformers in circuit with one another to provide a source of energy representative of the total fault current flow in all the external circuits, a current transformer on the busbar coupling connection, a directional relay device associated with each current transformer and energized partly therefrom and partly from the said source of energy, and means whereby the directional relay devices associated with the circuits connected to an individual busbar control the cutting out of such busbar in accordance with the direction of fault current flow in the associated circuits.

6. An electric protective arrangement for affording discriminative protection for the individual sections of an A. C. network or portion of a network to which a number of external circuits are connected, comprising in combination directional relay devices on all the circuits connected to each individual section, means whereby the operation of each directional relay device is effected by cooperation between the fault current flow in the associated circuit and the total fault current flow in all the external circuits connected to the whole network or network portion, a tripping relay for each section acting to disconnect the section from all circuits connected thereto, a lock-out relay for each section acting when energized to render the associated tripping relay inoperative, and means whereby the directional relay device associated with each external circuit controls the energization either of the tripping relay or of the lock-out relay on the section to which the external circuit is connected in accordance with the direction of fault current flow in the external circuit.

7. An electric protective arrangement for affording discriminative protection for the individual sections of an A. C. network or portion of a network to which a number of external circuits are connected, comprising in combination current transformers on all the external circuits connected to the network or network portion, means for permanently connecting all such transformers in circuit with one another to provide a source of energy representative of the total fault current flow in all the external circuits, current transformers on the circuits within the network or network portion connecting individual sections with one another, a directional relay device associated with each current transformer, means whereby such device is energized partly from the associated current transformer and partly from the source of energy representative of total fault current flow, a tripping relay for each section acting to disconnect the section from all circuits connected thereto, a lock-out relay for each section acting when energized to render the associated tripping relay inoperative, and means whereby the directional relay device associated with each external circuit controls the energization either of the tripping relay or of the lock-out relay on the section to which the external circuit is connected in accordance with the direction of fault current flow in the external circuit.

8. In a duplicate busbar electric system, the combination with the two busbars, of a busbar coupling connection by means of which the two busbars can be coupled together or disconnected from one another, a number of external circuits, means for selectively connecting such circuits to the busbars, and an electric protective arrangement for affording discriminative protection for the two busbars comprising a directional relay device associated with the busbar coupling connection, a directional relay device associated with each external circuit, means whereby the operation of each directional relay device is effected by cooperation between the fault current flow in the associated circuit and the total fault current flow in all the external circuits, a tripping relay for each busbar acting to disconnect the busbar from all circuits connected thereto, a lock-out relay for each busbar acting when energized to render the associated tripping relay inoperative, and means whereby the directional relay device associated with each external circuit controls the energization either of the tripping relay or of the lock-out relay on the busbar to which the external circuit is connected in accordance with the direction of fault current flow in the external circuit.

9. The combination with the features set forth in claim 6, of a master relay controlling the energization of all the tripping and lock-out relays, and means whereby the master relay is energized in accordance with the total fault current flow in all the external circuits.

10. The combination with the features set forth in claim 7, of a master relay controlling the energization of all the tripping and lock-out relays, and means whereby the master relay is energized in accordance with the total fault current flow in all the external circuits.

11. The combination with the features set forth in claim 8, of a master relay controlling the energization of all the tripping and lock-out relays, and means whereby the master relay is energized in accordance with the total fault current flow in all the external circuits.

12. In a duplicate busbar electric system, the combination with the two busbars, of a busbar coupling connection by means of which the two busbars can be coupled together or disconnected from one another, a number of external circuits, means for selectively connecting such circuits to the busbars, and an electric protective arrangement for affording discriminative protection for the two busbars comprising current transformers on all the external circuits, means for permanently connecting all such current transformers in circuit with one another to provide a source of energy representative of the total fault current flow in all the external circuits, a current transformer on the busbar coupling connection, a directional relay device associated with each current transformer and energized partly therefrom and partly from the said source of energy, a tripping relay for each busbar acting to disconnect the busbar from all circuits connected thereto, a lock-out relay for each busbar acting when energized to render the associated tripping relay inoperative, a master relay energized from the source of energy in accordance with the total fault current flow in all the external circuits, and means whereby the directional relay device on each external circuit acts if the master relay has operated to energize either the tripping relay or the lock-out relay on the busbar to which the external circuit is connected in accordance with whether the fault current in such circuit is flowing towards or away from the busbar.

13. An electric protective arrangement for affording discriminative protection for the individual sections of an A. C. network or portion of a network to which a number of external circuits are connected, comprising in combination directional relay devices on all the circuits connected to each individual section, and means whereby the directional relay devices control the cutting out of the section or prevent the section from being cut out in accordance with the direction of fault current flow in the associated circuits, the arrangement being such that the section is not cut out if the direction of fault current flow in any one circuit is different from the direction of fault current flow in any other circuit.

14. An electric protective arrangement for affording discriminative protection for the individual sections of an A. C. network or portion of a network to which a number of external circuits are connected, comprising in combination directional relay devices on all the circuits connected to each individual section, current transformers on all the external circuits connected to the network or network portion, means for permanently connecting all such transformers in circuit with one another to provide a source of energy representative of the total fault current flow in all the external circuits, means whereby each directional relay device is energized partly in accordance with the fault current flow in the associated circuit and partly from such source, and means whereby the directional relay devices control the cutting out of the section or prevent the section from being cut out in accordance with the direction of fault current flow in the associated circuits, the arrangement being such that the section is not cut out if the direction of fault current flow in any one circuit is different from the direction of fault current flow in any other circuit.

15. In a duplicate busbar electric system, the combination with the two busbars, of a busbar coupling connection by means of which the two busbars can be coupled together or disconnected from one another, a number of external circuits which can be selectively connected to the busbars, and an electric protective arrangement for affording discriminative protection for the two busbars comprising a directional relay device associated with the busbar coupling connection and responsive to the direction of fault current flow therein, a directional relay device associated with each external circuit and responsive to the direction of fault current flow therein, and means whereby the directional relay devices associated with the circuits connected to an individual busbar control the cutting out of the busbar or prevent the busbar from being cut out in accordance with the direction of fault current flow in the associated circuits, the arrangement being such that the busbar is not cut out if the direction of fault current flow in any of the associated circuits is away from the busbar.

16. An electric protective arrangement for affording discriminative protection for the individual sections of an A. C. network or portion of a network to which a number of external circuits are connected, comprising in combination directional relay devices on all the circuits connected to each individual section, a tripping relay for each section acting to disconnect the section from all circuits connected thereto, a lock-out relay for each section acting when energized to render the associated tripping relay inoperative, and means whereby the directional relay device associated with each external circuit controls the energization either of the tripping relay or of the lock-out relay on the section to which such circuit is connected in accordance with the direction of fault current flow in such circuit, the arrangement being such that the tripping relay on a section will not be operative if the direction of fault current flow in any of the circuits connected to the section is away from the section.

17. An electric protective arrangement for affording discriminative protection for the individual sections of an A. C. network or portion of a network to which a number of external circuits are connected, comprising in combination directional relay devices on all the circuits connected to each individual section, means whereby the directional relay devices control the cutting out of the section or prevent the section from being cut out in accordance with the direction of fault current flow in the associated circuits, the arrangement being such that the section is not cut out if the direction of fault current flow in any one circuit is different from the direction of fault current flow in any other circuit, a master relay energized in accordance with the total fault current flow in all the external circuits, and means whereby when such total fault current flow is zero the master relay prevents any of the sections from being cut out by the directional relay devices.

18. In a duplicate busbar electric system, the combination with the two busbars, of a busbar coupling connection by means of which the two busbars can be coupled together or disconnected from one another, a number of external circuits which can be selectively connected to the busbars, and an electric protective arrangement for affording discriminative protection for the two busbars comprising a directional relay device associated with the busbar coupling connection and responsive to the direction of fault current flow therein, a directional relay device associated with each external circuit and responsive to the direction of fault current flow therein, a tripping relay for each busbar acting to disconnect the busbar from all circuits connected thereto, a lock-out relay for each busbar acting when energized to render the associated tripping relay inoperative, means whereby the directional relay device associated with each external circuit controls the energization either of the tripping relay on the busbar to which the external circuit is connected when the direction of fault current flow in such circuit is towards the busbar or of the lock-out relay on such busbar when the direction of fault current flow in such circuit is away from the busbar, a master relay energized in accordance with the total fault current flow in all the external circuits, and means whereby when such total fault current flow is zero the master relay prevents the tripping relays and the lock-out relays from being energized by the directional relay devices.

HENRY LEYBURN.